(12) United States Patent
Pierer et al.

(10) Patent No.: US 8,683,551 B2
(45) Date of Patent: Mar. 25, 2014

(54) PEER-TO-PEER NETWORK

(75) Inventors: Marcel Pierer, Waiblingen (DE); Andreas Hertle, Freiburg (DE); Marco Tomsu, Ditzingen (DE)

(73) Assignee: Alcatel Lucent, Paris (FR)

( * ) Notice: Subject to any disclaimer, the term of this patent is extended or adjusted under 35 U.S.C. 154(b) by 1203 days.

(21) Appl. No.: 12/264,715

(22) Filed: Nov. 4, 2008

(65) Prior Publication Data
US 2009/0119747 A1 May 7, 2009

(30) Foreign Application Priority Data
Nov. 5, 2007 (EP) .................................... 07291326

(51) Int. Cl.
*G06F 7/04* (2006.01)

(52) U.S. Cl.
USPC ........ 726/3; 726/1; 726/4; 709/201; 709/202; 709/203; 709/219; 709/238

(58) Field of Classification Search
USPC .............. 726/1, 3, 4; 709/204, 201–203, 219, 709/224–226, 238
See application file for complete search history.

(56) References Cited

U.S. PATENT DOCUMENTS

| | | | |
|---|---|---|---|
| 7,395,536 B2 * | 7/2008 | Verbeke et al. | 718/100 |
| 8,037,202 B2 * | 10/2011 | Yeager et al. | 709/238 |
| 8,046,490 B1 * | 10/2011 | Wu | 709/238 |
| 8,108,455 B2 * | 1/2012 | Yeager et al. | 709/202 |
| 2004/0088348 A1 * | 5/2004 | Yeager et al. | 709/202 |
| 2004/0088646 A1 * | 5/2004 | Yeager et al. | 715/500 |
| 2004/0098447 A1 * | 5/2004 | Verbeke et al. | 709/201 |
| 2004/0133640 A1 * | 7/2004 | Yeager et al. | 709/204 |
| 2006/0242405 A1 | 10/2006 | Gupta et al. | |
| 2007/0156813 A1 * | 7/2007 | Galvez et al. | 709/204 |
| 2012/0117229 A1 * | 5/2012 | Van Biljon et al. | 709/224 |

FOREIGN PATENT DOCUMENTS

EP    1 282 289 A    2/2003

OTHER PUBLICATIONS

Amoretti, M. et al, "Introducing Secure Peergroups in $SP^2A$," Proceedings of the 2005 Second International Workshop on Hot Topics in Peer-to-Peer Systems (HOT-P2P 2005), 8 pages, Jul. 21, 2005.
Lo, V. et al., "Scalable Supernode Selection in Peer-to-Peer Overlay Networks," Proceedings of the 2005 Second International Workshop on Hot Topics in Peer-to-Peer Systems (HOT-P2P 2005), 8 pages, Jul. 21, 2005.
Marin, R. et al., "Securing the Madeira Network Management System," Software, Telecommunications and Computer Networks, 2007, Softcom 2007, $15^{th}$ International Conference on, IEEE, PI, 5 pages, Sep. 1, 2007.
Mekouar, L., et al., "Peer-to-Peer's Most Wanted: Malicious Peers," Computer Networks, Elsevier Science Publishers B.V., Amsterdam, NL, vol. 50, No. 4, pp. 545-562, Mar. 15, 2006.
European Search Report (dated May 21, 2008).
European Search Report (dated Jul. 16, 2008).

* cited by examiner

*Primary Examiner* — Thu Ha Nguyen
(74) *Attorney, Agent, or Firm* — Fay Sharpe LLP

(57) ABSTRACT

In order to provide security within a peer-to-peer network (100) comprising common peers (0, 7, 10, 15, 20, 28) providing the functionality of the network (100), at least one police peer (4, 9, 23) is added to the network (100), said at least one police peer (4, 9, 23) providing security within the network (100) and being certified by a central certification authority (110) managing the certification and positioning of the peers (0, 4, 7, 9, 10, 15, 20, 23, 28).

6 Claims, 3 Drawing Sheets

PEER-TO-PEER NETWORK

BACKGROUND OF THE INVENTION

Figure 1:
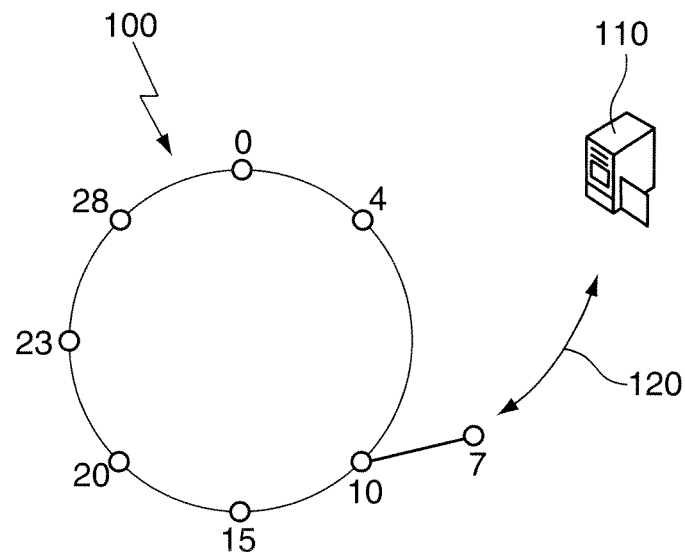

The invention is based on a priority application EP97291326.2 which is hereby incorporated by reference.

The invention relates to a peer-to-peer network comprising common peers providing the functionality of the network. A peer-to-peer network is based on computing power, bandwidth and other resources, said resources being distributed across many terminals and peers. The peers are equal members, thus there exists no client and server architecture in a peer-to-peer network. The peers are organized in a so-called overlay network, i.e., the peers maintain a set of links to all other peers in form of routing/finger tables. Structured peer-to-peer networks like CHORD have a defined structure, i.e., their routing and look-ups are well defined. The network protocol CHORD creates an overlay network topology based on Distributed Hash Tables. A peer-to-peer network is scalable with increasing number of peers whereby defined stabilization processes manage the rapid joining or leaving of peers. Peer-to-peer networks are used for the realization of Voice over IP and multimedia solutions due to low cost, self-configuration, robustness and scalability. Open, standardized, structured and self-organizing peer-to-peer networks form the basis of public telecommunications systems, collaboration/community services over Internet, voice/multimedia conferencing, instant messaging, push-to-talk applications, information/file sharing for carriers and enterprises.

Those peer-to-peer networks provided with a minimum centralized infrastructure has still several unresolved security problems. Today's peer-to-peer network architectures are either classified as restricted or use reputation mechanism to establish security and trust between the peers. In case of restricted applications the software code is encrypted to prevent abuses for the purpose of creating malicious code. The network architecture and the communication protocols are withheld from general circulation. Reputation mechanisms are either user-based where the peers rate other peers, or transaction-based, where the trust value is computed based on all transactions a peer has performed with other peers. Said established security mechanism can not be applied to open and standardized public telecommunication systems. Restricted applications require a close system because security can only be guaranteed as long as the secrets are kept secret. The use of reputation mechanisms was proposed and researched, but the security threats could not be resolved. Machine-to-machine reputation systems for a public communication system have to be based on the transaction and message behaviour of peers, not on the user's behaviour.

The self-organizing mechanism implemented in the peer-to-peer network creates a robust topology and ensures consistency of the stored data. The use of an intelligent security mechanism shall protect the peers, i.e., the network participants, the network topology and the stored data against malicious peers and the circulation of malicious code.

SUMMARY OF THE INVENTION

It is the therefore an object of the invention to provide a security mechanism for an open and standardized public telecommunication system.

SHORT DESCRIPTION OF THE INVENTION

This object is achieved, in accordance with the invention, by adding at least one police peer to a peer-to-peer network, said at least one police peer providing security within the network and being certified by a central certification authority managing the certification and positioning of the peers. The at least one police peer works as an extended arm of the authorization system and provides/or supports the security in the peer-to-peer network. The central certification authority manages the police peers within the network. But the police peers shall be intelligent enough to operate independently and in co-operation with other police peers.

Police peers are certified, created and placed by a central unit, like the certification authority. Therefore all police peers can be identified and verified, as all police peer certificates are signed by the central certification authority. The number of the police peers is managed by the central certification authority. Police peers:

- can take any position within the network to fulfil their duties,
- fulfil in an invisible way the same duties within the network like other peers (e.g. storing data, forwarding messages,),
- can be appealed by other peers to analyze a network problem, like attacks of other malicious peers,
- analyse situations and start investigations to locate malicious peers, if necessary in co-operation with other police peers,
- are interconnected by an additional overlay network to provide co-operation, secure data storage and communication,
- can enact the segregation of malicious peers from the network, e.g. by withdrawal of certificates,
- should be chosen from a pool of peers with guarantied reliability,
- can be part of a scalable team of representatives acting on behalf of the central unit, e.g. to response certification verification queries,
- can be peers for various trust-relevant services, e.g. bootstrap peer and NAT traversal mechanisms (TURN, STUN).

In a preferred embodiment of the invention the peers communicate with the certification authority only during the joining process of a new peer. A certification authority is only involved, when new certificates have to be assigned or existing ones expire. This so-called hybrid approach reduces the need for the certification authority and avoids the impact of the central certification authority on the scalability of the network To ensure the authentication and certification of all peers, within the network, a centralized authentication structure is proposed.

In any case the police peers themselves have to be certified and assigned by a central certification authority, as the proposed hybrid authorization system. This is necessary to prevent malicious peers from imitating police peer, which is possible in a public telecommunication system, with the specific requirement of open and standardized protocols. The hybrid authorization system consists of a certification authority located in the Internet, to manage the certification and positioning of peers as well as the security provided by a police authority. This police authority is represented by police peers in the network as an extended arm of the certification authority.

Preferably, the peer-to-peer network has a structured overlay, e.g., a ring structure provided by the network protocol CHORD. A further development of the inventive peer-to-peer network is characterized in, that the certificate of said at least one police peer contains the common signature of a common peer and in addition a police signature. This allows the police peer to do investigations undercover. In case of a plurality of police peers being added to the network, the police peers preferably are interconnected in an additional overlay network.

Also within the scope of the invention is a method for providing security in a peer-to-peer network comprising common peers. At least one police peer providing security within the network and a central certification authority managing the certification and positioning of the peers. Whereby the three steps of the inventive method are managed and/or performed by the at least one police peer. In a first step the functionality of possible malicious peers are checked. If the malignance of the malicious peer is affirmed, a certification authority declares in a second step the certificate of the malicious peer for invalid and the malicious peer is asked to disconnect from the network. If the disconnection of the malicious peer fails, a third step follows, wherein all other peers close their connections with the malicious peer. A preferred variant of the inventive method is characterized in, that in the first step the possible malicious peer is surrounded by a plurality of police peers.

Further within the scope of the invention is a computer program product implementing the inventive method.

Further advantages of the invention can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

DRAWING

Figure 2:
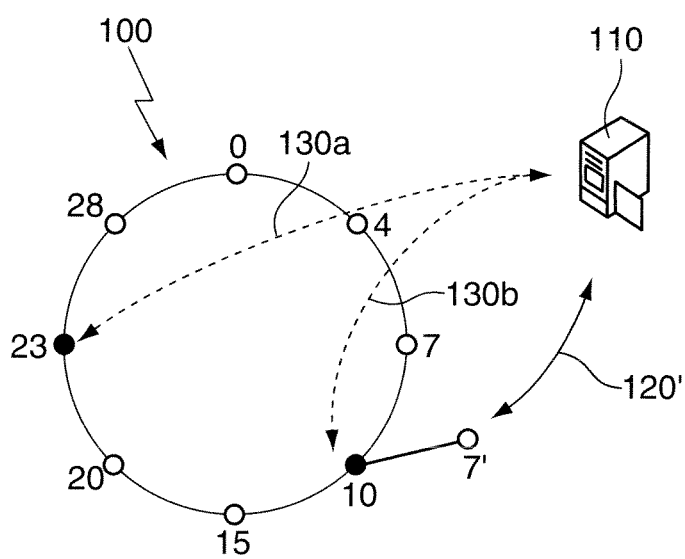
Figure 3:
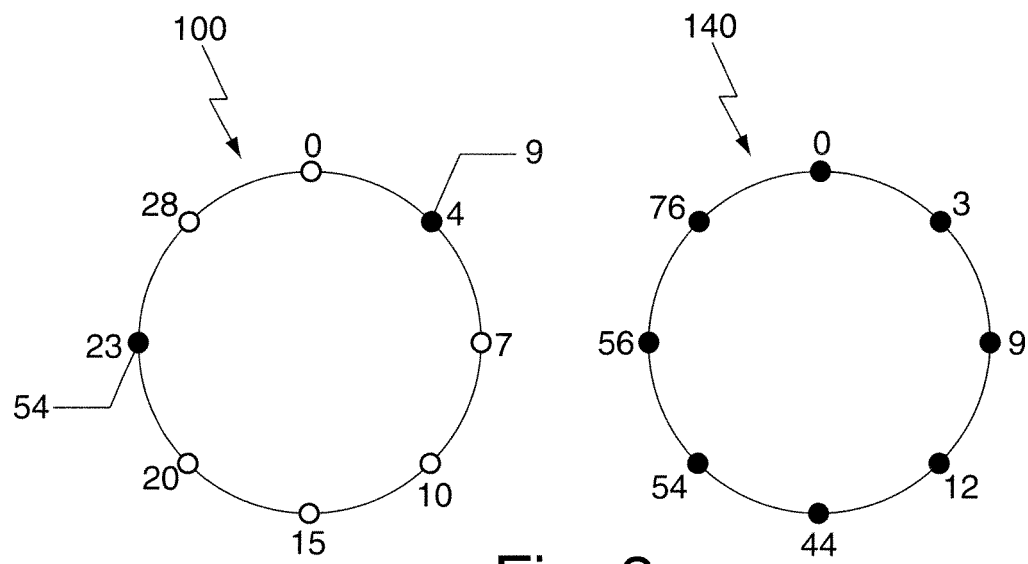
Figure 4:
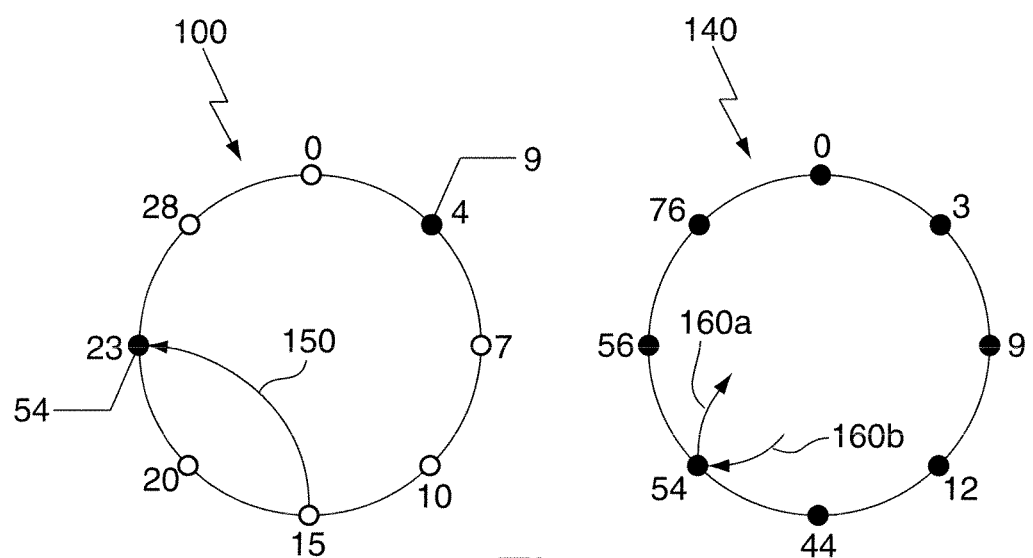
Figure 5:
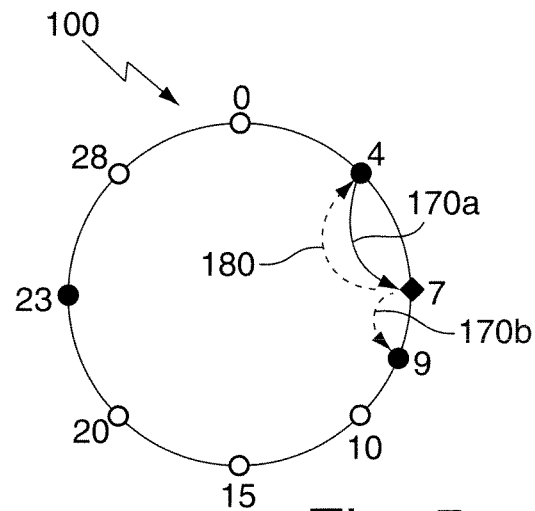
Figure 6A:
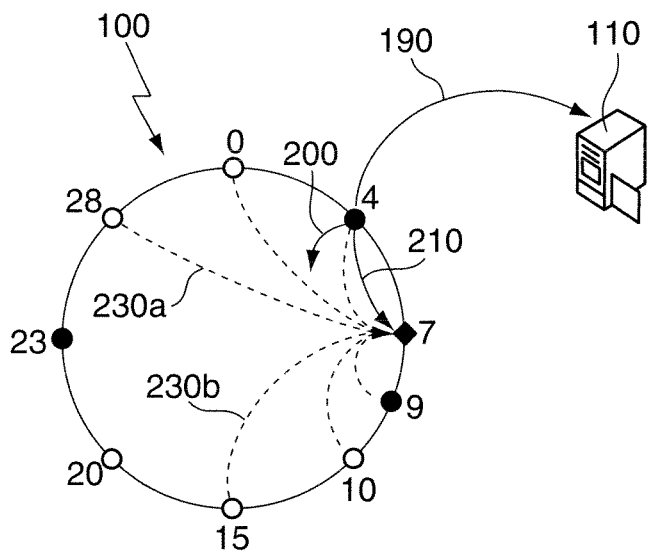
Figure 6B:
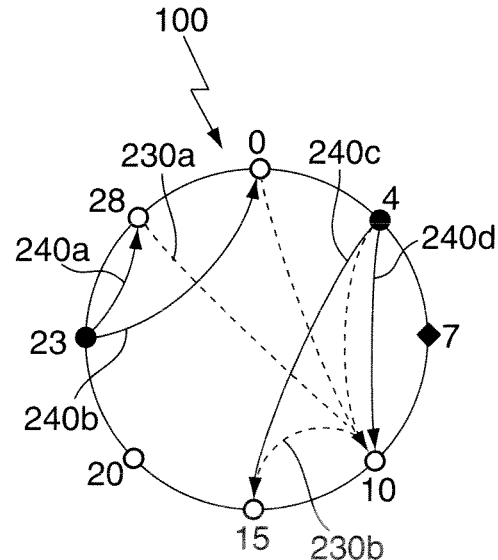

The inventive peer-to-peer network as well as the steps of the inventive method are shown in the drawing. It shows:

FIG. 1 an exemplary peer-to-peer network during the joining of a new peer;

FIG. 2 the peer-to-peer network after the joining of the new peer;

FIG. 3 the peer-to-peer network and an additional overlay network of police peers;

FIG. 4 the networks according to FIG. 3 illustrating the functioning of the police peers;

FIG. 5 the peer-to-peer network during the check of a possible malicious peer; and FIG. 6a, 6b the peer-to-peer network performing the segregation of a malicious peer.

FIG. 1 shows a peer-to-peer network 100 comprising peers 0, 4, 10, 15, 20, 23, 28 located at network positions arranged in a ring structure. The certification and positioning of the peers 0, 4, 7, 10, 15, 20, 23, 28 is managed by a certification authority 110. To ensure the authentication and certification of all peers 0, 4, 7, 10, 15, 20, 23, 28 within the network 100, a centralized hybrid authentication structure is proposed. Authentication is necessary to verify the identity of the peers 0, 4, 7, 10, 15, 20, 23, 28 and to build up trust between the peers 0, 4, 7, 10, 15, 20, 23, 28. The hybrid approach is proposed to minimize the impact on the scalability of the system. That means that the central certification authority 110 is only requested if new certificates have to be assigned to the peers 0, 4, 7, 10, 15, 20, 23, 28. This is necessary if new peers 7 join the system or existing peers 0, 4, 10, 15, 20, 23, 28 need new certificates. A certificate compromises the certificates' lifetime, the peers' position, the Public Key of the certification authority 110 and a signature to verify the certificate. The position of the peers 0, 4, 10, 15, 20, 23, 28 within the network 100 is computed from the certification authority 110 to balance the network 100 and to prevent malicious peers from choosing advantageous positions. The signature of the certificate is signed with the private key from the certification authority 110 and can be verified using the public key of the certification authority 110, which every peer 0, 4, 10, 15, 20, 23, 28 knows (Public Key Infrastructure). Therefore certificates can be verified without to consult the certification authority 110 again. FIG. 1 shows how peer 7 wants to join the network 100 and is requesting a certificate from the certification authority 110 (arrow 120). Peer 10 verifies the certificate and allows peer 7 to join into the network 100. As new Peers need a reliable point to join the network, police peers can provide those trust-relevant services.

As illustrated in FIG. 2, the peer-to-peer network 100 contains police peers 10, 23, (filled circle) being equal peers and fulfilling the same duties as common peers 0, 4, 7, 15, 20, 28. The certification authority 110 controls the police peers 10, 23 (arrows 130a, 130b), i.e., assigns specific certificates containing a police signature as well as a common signature and manages the position of the police peers 10, 23. By this means, no other peer can fake a police peer and the common signature is used by the police peers 10, 23 to investigate undercover. The peers 0, 4, 7, 15, 20, 28 get information about the nearest police peers 10, 23 during the joining process, in the illustrated case the new peer 7 is informed about the police peer 10.

In FIG. 3 is depicted that the police peers are organized in an own additional overlay network 140. The police peers 4, 23 of the peer-to-peer network 100 take the network positions 9 and 54 in the additional overlay network 140. The peers' position within the public network 100 and the police authority network, i.e., the additional overlay network 140 are not equal, as the police peers 4, 23 can change its position within the public network 100, e.g. for investigations. The additional overlay network 140, the so-called police authority network, serves for storing information about malicious peers and for a better communication and cooperation between the police peers. Thus all police peers 4, 23 can use the distributed database to store information about malicious peers, for communication and co-operation aside the public network 100.

FIG. 4 shows the functionality of the peer-to-peer network 100 and the additional overlay network 140. A common peer 15 can report a defined crime to the police peer 23 (arrow 150) which publishes the crime and makes a look-up for more information within the additional overlay network 140 (arrows 160a, 160b). During the joining process of common peers 0, 4, 7, 15, 20, 28, the certification authority informs the peers 0, 4, 7, 15, 20, 28 about the nearest police peers 4, 23. Therefore, each peer 0, 4, 7, 15, 20, 28 can inform a police peer 4, 23 in case of attacks or unusual situations. As shown in FIG. 4, peer 15 informs the police peer 23. The police peer 23 receiving such a message can then use the police authority network to collect more information and co-operate with other police peers to find a solution.

FIG. 5 illustrates an investigation process provided by two police peers 4, 9, whereby police peer 9 joins after the possible malicious peer 7 (square). An investigation process comprises tests with standard methods like forwarding of messages, look-up, publishing and retrieving of data as well as any services provided. The police peers 4 and 9 analyze the functionality of the possible malicious peer 7 (arrows 170a, 170b, 180). To analyze a situation and to locate malicious peers 7, police peers 4, 9, 23 can change their position within the network 100 and co-operate with other police peers 4, 9, 23. In FIG. 5 possible malicious peer 7 is surrounded by police peers 4, 9. The police peers 4, 9 check the functionality of peer 7, like forwarding of messages, storing and retrieving of values as well as any services provided.

The method for providing security in the peer-to-peer network 100 and segregation of the malicious peer 7, respectively, is illustrated in FIG. 6a, 6b. The police peer 4 informs the certification authority 110 to declare the certificate of the malicious peer 7 for invalid (arrow 190) and publishes the information about the invalid certificate such that other peers can react (arrow 200). Then police peer 4 asks the malicious peer 7 to disconnect from the network 100 (arrow 210). The successing and predecessing common peers 28, 0, 10, 15 still keep alive their (finger) connections 230a, 230b with the malicious peer 7. In the next step, the police peers 23, 4 inform the successing and predecessing common peers 28, 0, 10, 15 to close their (finger) connections 230a, 230b with the malicious peer 7 (arrows 240a, 240b, 240c, 240d). As a result, the malicious peer 7 is disconnected, i.e., segregated from the network 100. Peer 10 is now the next peer after peer 4, thus peer 7 is segregated from the network.

The invention claimed is:

1. A peer-to-peer network comprising:
   common peers and at least one police peer in a structured overlay of the network, said at least one police peer providing security within the network by checking the functionality of possible malicious peers; and
   a central certification authority for managing the certification of the peers in the structured overlay of the network;
   wherein the central certification authority is further adapted for managing the positioning of the peers in the structured overlay of the network, and in that the peer-to-peer network is adapted to surround a possible malicious peer by a plurality of police peers.

2. The peer-to-peer network according to claim 1, wherein the peers communicate with the certification authority only during the joining process of a new peer.

3. The peer-to-peer network according to claim 1, wherein the certificate of said at least one police peer contains the common signature of a common peer and in addition a police signature.

4. The peer-to-peer network according to claim 1, wherein the police peers are interconnected in an additional overlay network.

5. A method for providing security in a peer-to-peer network comprising common peers, at least one police peer providing security within the network and a central certification authority managing the certification and positioning of the common peers and the at least one police peer in a structured overlay of the network,
   comprising the following steps managed and/or performed by the at least one police peer:
   (a) the functionality of a possible malicious peer is checked and the possible malicious peer is surrounded by a plurality of police peers;
   (b) if the malignance of the malicious peer is affirmed, the certification authority declares the certificate of the malicious peer invalid and the malicious peer is asked to disconnect from the network;
   (c) if the disconnection of the malicious peer in step fails, all other peers close their connections with the malicious peer;
   wherein the at least one police peer resides in the structured overlay of the network.

6. A non-transitory computer program product implementing the method according to claim 5.

* * * * *